W. WALKER.

Plaiting-Attachment for Sewing-Machines.

No. 6,635. Reissued Sept. 7, 1875.

Witnesses.

L. H. Latimer.

W. G. Pratt.

Inventor.

William Walker per Crosby Gregory

Atty's.

N. PETERS, PHOTO-LITHOGRAPHER, WASHINGTON, D. C.

UNITED STATES PATENT OFFICE.

WILLIAM WALKER, OF BROOKLYN, NEW YORK, ASSIGNOR TO GEORGE H. WOOSTER.

IMPROVEMENT IN PLAITING ATTACHMENTS FOR SEWING-MACHINES.

Specification forming part of Letters Patent No. 141,610, dated August 5, 1873; reissue No. 6,635, dated September 7, 1875; application filed August 30, 1875.

*To all whom it may concern:*

Be it known that I, WILLIAM WALKER, of Brooklyn, in the county of Kings and State of New York, have invented an Improved Plaiting Attachment to Sewing-Machines, of which the following is a specification:

This invention relates to a new plaiting attachment; and has for its object, chiefly, to form the plaits on the fabric before the same arrives upon the surface of the work-plate of the machine, and thereby to avoid the friction and uncertainty of effect which result from the present mode of plaiting on the surface of supporting-plates.

This invention consists in a cloth-carrier or pair of nippers, adapted to shut and open, to engage the cloth to be ruffled or plaited, and carry it forward, and then to lift from the cloth on the return stroke of the cloth-carrier, the two blades of the cloth carrier or nippers being connected with a reciprocating arm or nipper-carrier to move both members of the cloth-carrier together. Also, in the combination, with a cloth-carrier to advance the material for a fold, of a cloth bender or hitter, adapted to bend the cloth in advance of the carrier at right angles ,or substantially so, to the movement of the cloth-carrier, or the feed to insure the formation of the plait or fold always in the desired direction, and by the action of the bender the plaits are evenly and clearly defined. Without this bender the fold of the fabric produced by the cloth-carrier might be formed downward and upward irregularly. The nippers are composed of two plates or blades, the lower of which is shown as having a reciprocating movement in substantially a horizontal plane, while the upper blade or plate, besides its movement in harmony with the lower blade, moves up and down, to alternately release and grasp the material lying between the two plates, the upper plate being raised or lifted when the nippers move back, and being closed or shut down automatically when the nippers move forward. The edge of the plate *g* is shown as notched at *g'*, to assist it to engage the material, and the lower blade or plate *f* is shown as having a straight edge.

To carry this invention into effect a series of cams on the main spindle of the sewing-machine is used for the purpose of moving the nippers backward and forward, opening and closing the same, and elevating and lowering the upper blade, all as hereinafter more fully described.

Figure 1:
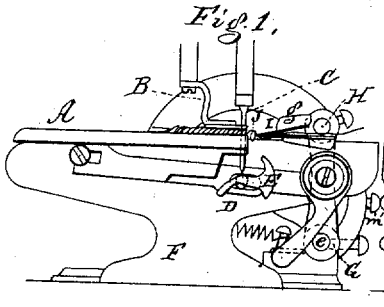
Figure 4:
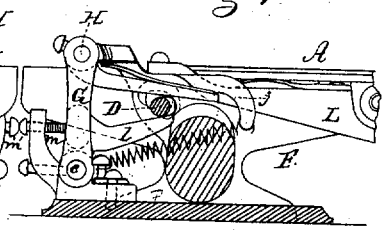
Figure 3:
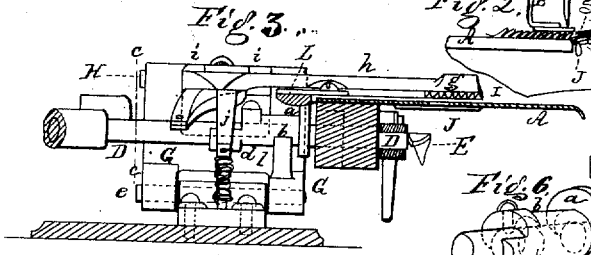
Figure 2:
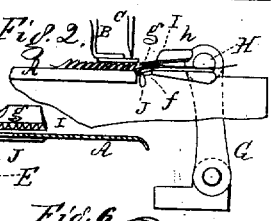
Figure 5:
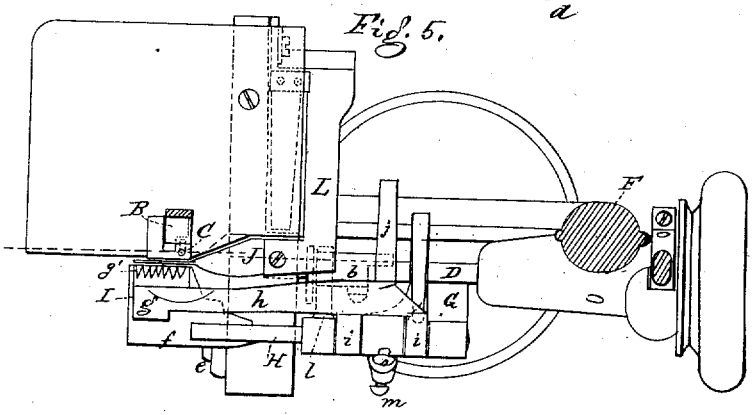

In the accompanying drawing, Figure 1 represents a side view, partly in section, of a sewing-machine provided with my improved attachment. Fig. 2 is a similar view of the parts, showing them, however, in different positions. Fig. 3 is a front elevation, partly in section, showing the rotary spindle and its cams. Fig. 4 is a vertical transverse section thereof, taken on the plane of the line C C, Fig. 3. Fig. 5 is a top view of the same; and Fig. 6 a detail perspective view of that portion of the spindle which carries the cams.

Similar letters of reference indicate corresponding parts in the several figures.

Figure 6:
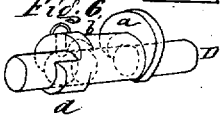

The letter A represents the work-plate of a sewing-machine of suitable construction. B is the presser-foot of the same; C, the needle-bar and needle. D is the rotary main spindle of the machine, carrying a hook, E, or shuttle or other device, according to the construction of the machine. Upon the spindle are mounted three cams, *a b d*, which may all be made in one piece, as indicated in Fig. 6, or separately applied thereto. To the supporting-frame F is pivotéd at *e* an arm or nipper-carrier, G, which, at its upper end, carries a pin or rod, H. This pin or rod extends parallel to the spindle D toward the side of the machine, and carries at its end, and on a plane slightly above the surface of the plate A, the lower jaw or plate *f* of the plaiting-nippers or cloth-carrier I. The upper jaw *g* of these nippers is attached to an arm or bar, *h*, which is hinged at *i* to the rod H. A laterally-projecting arm, *j*, of the bar *h* rests on the cam *d* of the spindle, so that during the rotations of the spindle the upper jaw will be vibrated to alternately open and shut the nippers. The cam *b* of the spindle D bears against a laterally-projecting arm, *l*, of the arm or nipper-carrier G, and causes, during the rotations of the spindle D, the vibration of the arm G in such manner that the nippers I will be alternately carried toward the sewing-plate A, to enter beneath the presser-foot and away from said plate A. The outward motion of the arm G, by which the nippers are carried off the plate A, is limited by a screw, *m*, bearing against the said frame, and can, by turning said screw, be regulated, so that said frame will move back to a greater or less extent. Suitable springs are used in connection with the moving arm G and bar *h*, to keep the same in contact with the cams of the spindle D, and to produce the motions in direction opposite to that in which they are moved by said cams.

Between the edge of the plate A and the nippers I is interposed a cloth bender or hitter, J, which is attached to a pivoted bar, L, resting in part on the cam *a* of the spindle D. By means of this cam the bender is moved alternately up and down.

The operation of this apparatus is as follows: The fabric to be plaited or formed into ruffles is drawn through the nippers and under the presser-foot of the sewing-machine. Whenever the nippers move back away from the plate A they open by the upper plate *g*, swinging up, and they then move freely over the fabric, which is being held in place by the presser-foot. As soon as the backward stroke of the nippers has been completed they close upon the fabric, and are then moved forward, the presser-foot still holding the forward part of such fabric. At the same time that the nippers move forward with the fabric which they gripe the bender J is moved up and carries the fabric into an upward fold, preventing thereby the bulge from being formed downwardly, which, without the use of such bender, might every now and then be the case. Just before the nippers arrive at the edge of the plate A the bender J swings down out of the way of such nippers, allowing the same to move forward over the face of the plate A, and to carry the plait of the fabric under the presser-foot. The foot is carried down to hold the plait in position until the needle descends to sew it fast, and the operation is repeated as long as desired.

The cloth-carrier or nippers I in their reciprocating motion actually vibrate on the pivot *e* of the arm G, but the vibration, or rather the up-and-down displacement of the lower blade, owing to the vibration, is so little as to be imperceptible, and without any effect during operation.

Box-plaits may be formed by making the bender J slotted or double to come in contact with both sides of the fabric, and by moving it with a double cam on a counter-shaft, so that it will move the plate upward and downward alternately, the distance between the plaits being governed by the speed of the counter-shaft relatively to the spindle D.

Both members, *f g*, of the nippers move forward and backward together and simultaneously. The forward edges of both blades move forward to substantially the same point. The upper blade is lifted at or before the lower blade commences to retreat, and during the backward movement of the nippers the edges of both members *f* and *g* start and move backward together or simultaneously. The upper member *g* is pivoted to the carrier of the lower member, and a positive lifting-and-falling movement is imparted to the upper member through a cam or projection which strikes an arm projecting from the arm or bar *h*, to which *g* is attached.

I claim—

1. In a plaiting or ruffling mechanism, the combination of an arm or nipper carrier with a pair of reciprocating nippers or jaws, the upper member of which is adapted to be shut or closed upon and move the cloth or material forward for a fold, and to be opened and release itself from the material on the return-stroke of the nippers, both members of the nippers reciprocating forward and backward simultaneously, and to the same distance, substantially as described.

2. The horizontally-reciprocating under plate *f* and its carrier, in combination with the upper plate, adapted to be reciprocated by the carrier of the under plate, and with mechanism for automatically lowering and raising the upper plate, substantially as described, with relation to the under plate, to engage or free the material lying on the under plate, substantially as described.

3. In a plaiting or ruffling mechanism, the combination, with a cloth-carrier, of a bender or hitter adapted to bend the cloth for a fold prior to its being carried forward, substantially as described.

4. The combination, with a presser and a bender adapted to move the material in substantially a perpendicular direction, of a cloth-carrier adapted to move the material forward in substantially a horizontal direction and complete the fold started by the bender, substantially as described.

5. The combination of a bender and cloth-carrier, adapted to operate substantially as described, with a feeding mechanism to move the material after the fold is completed, substantially as set forth.

6. In combination, a vertically-movable bender, reciprocating nippers, and a cloth plate or support, the bender being interposed between the nippers and support, substantially as and for the purpose described.

WILLIAM WALKER.

Witnesses:
J. V. ROCKWELL,
A. TUCKER.

BEST AVAILABLE COPY